(12) United States Patent
Naito et al.

(10) Patent No.: US 9,840,600 B2
(45) Date of Patent: Dec. 12, 2017

(54) DIENE RUBBER COMPOSITION CONFIGURED TO BE VULCANIZED AT LOWER TEMPERATURE; AND MANUFACTURING PROCESS OF RUBBER ARTICLE FROM THE SAME

(71) Applicant: KRATON POLYMERS U.S. LLC, Houston, TX (US)

(72) Inventors: Fumio Naito, Ibaraki (JP); Yoshikatsu Nakazawa, Ibaraki (JP)

(73) Assignee: Kraton Polymers U.S. LLC, Houston, TX (US)

( * ) Notice: Subject to any disclaimer, the term of this patent is extended or adjusted under 35 U.S.C. 154(b) by 0 days.

(21) Appl. No.: 15/083,655

(22) Filed: Mar. 29, 2016

(65) Prior Publication Data

US 2016/0289400 A1    Oct. 6, 2016

(30) Foreign Application Priority Data

Mar. 30, 2015  (JP) ................................. 2015-068140

(51) Int. Cl.

| | | |
|---|---|---|
| *B60C 1/00* | (2006.01) | |
| *C08J 3/24* | (2006.01) | |
| *C08J 5/18* | (2006.01) | |
| *C08K 5/14* | (2006.01) | |
| *C08L 9/00* | (2006.01) | |
| *C08L 7/00* | (2006.01) | |

(52) U.S. Cl.
CPC ................. *C08J 3/247* (2013.01); *C08J 5/18* (2013.01); *C08K 5/14* (2013.01); *C08L 7/00* (2013.01); *C08L 9/00* (2013.01); *C08J 2309/00* (2013.01); *C08L 2205/025* (2013.01)

(58) Field of Classification Search
CPC .... C08J 3/247; C08J 5/18; C08K 5/14; C08L 9/00; C08L 2205/025
USPC ......................................................... 524/526
See application file for complete search history.

(56) References Cited

U.S. PATENT DOCUMENTS

| | | |
|---|---|---|
| RE27,145 E | 6/1971 | Jones |
| 9,422,422 B2 * | 8/2016 | Naito ........................ C08L 9/00 |
| 2009/0036045 A1 * | 2/2009 | Okamoto ................ B24B 37/24 451/540 |

FOREIGN PATENT DOCUMENTS

| | | |
|---|---|---|
| JP | H04275352 A | 9/1992 |
| JP | H04293946 A | 10/1992 |
| JP | H06100741 A | 4/1994 |

OTHER PUBLICATIONS

Manik, SP and Banerjee, S, "Studies on Dicumylperioxide Vulcanizationof Natural Rubber in Presence of Sulfur and Accelerators," Rubber Chemistry and Technology, Jul. 1969, vol. 42, No. 3, pp. 744-758.

* cited by examiner

*Primary Examiner* — Hui Chin (74) *Attorney, Agent, or Firm* — Ekatherina Serysheva (57) ABSTRACT

The present invention provides a process for forming an article from a diene rubber, comprising: providing a raw diene rubber substance comprising 1,2-polybutadiene rubber component; adding to the raw diene rubber substance a peroxide as a vulcanizing agent; softening the raw diene rubber at a first temperature of not more than 200° C.; vulcanizing the diene rubber at a second temperature of not more than 200° C., with contacting the diene rubber to an ambient atmosphere; and forming from the vulcanized diene rubber an article.

18 Claims, 1 Drawing Sheet

DIENE RUBBER COMPOSITION CONFIGURED TO BE VULCANIZED AT LOWER TEMPERATURE; AND MANUFACTURING PROCESS OF RUBBER ARTICLE FROM THE SAME

TECHNICAL FIELD

The present invention relates to a process for forming a diene rubber article, and particularly relates to a process for forming a diene rubber article vulcanized at a lower temperature. The present invention also relates to an article prepared by the process, and to a raw diene rubber material for the process.

BACKGROUND

Rubber is an elastic polymeric substance, and is classified as one of thermoplastic elastomers (TPEs). Rubbers have been distinguished from other resins and polymer oils in physical and chemical properties. Diene rubber is one kind of rubber in which main chains have double bonds. Diene rubber generally requires to be vulcanized in practice.

Vulcanization is a process to convert or modify a raw diene rubber substance. Vulcanization processes use some vulcanizing agents and/or heating to create a strong bond or cross-linking between chain molecules in the diene rubber. Vulcanization processes modify raw diene rubbers to increase some mechanical properties such as elasticity and tensile strength, and to reduce plastic flow. Vulcanization can also prevent diene rubber from swelling at least in some extent.

Sulfur has been used as the most popular vulcanizing agent in the art of rubber manufacturing for many decades and centuries. Sulfur-based vulcanizing agents, such as sulfur powder ($S_8$), however need a higher temperature and a longer time period to promote vulcanization process in a raw diene rubber.

Conventional raw diene rubber compositions generally require a relatively large amount of sulfur-based vulcanizing agent to vulcanize, and then the final rubber would be colored or tarnished by the sulfur. The resulted rubber composition which contains a large amount of sulfur would have a bad haze or yellowing.

It has been also known that sulfur as a vulcanizing agent sometimes leads to a blooming on the surface of rubber in a storage. The blooming phenomenon may pollute an ambient environment around a rubber storage container or tank. In addition, sulfur content level of a conventional rubber article may not meet with industrial or environmental standards among various countries and prefectures. A large amount of sulfur also causes an malodor.

There have been in the art some studies about peroxide for rubber vulcanizations to reduce or terminate the amount of sulfur used to lighten the toxic or harmful effect of sulfur.

Patent Document 1 (JPH04275352A filed by NOF Corp.) discloses a conventional vulcanization process for ethylene propylene rubbers (EPRs) using peroxy monocarbonate.

Patent Document 2 (JPS4615420B filed by Nippon Kayaku) discloses a conventional vulcanization process for EPDM using peroxy carbonate.

Patent Document 3 (JPH04293946A) and Patent Document 4 (JPH06100741A), filed by JSR, disclose some conventional EPR compositions subjected to vulcanization using dicumylperoxide.

CITATION LIST

Patent Literature

Patent Document 1: Japanese Patent Laid-open Publication No. H04-275352
Patent Document 2: Japanese Patent Examined Publication No. S46-015420
Patent Document 3: Japanese Patent Laid-open Publication No. H04-293946
Patent Document 4: Japanese Patent Laid-open Publication No. H06-100741

SUMMARY OF INVENTION

Technical Problem

It has been known that conventional diene rubber compositions cannot be industrially formed into a satisfactory article if a vulcanization process is carried out under an ambient atmosphere (i.e., open-type process). Unlike those in a process using a sealed molding die, such as an injection molding process and a press vulcanization process, raw rubber materials naturally contact with an ambient atmosphere which often contains oxygen gas during an open-type vulcanization process using a peroxide. Oxidizing agent, such as oxygen radical derived from oxygen gas, sometimes extremely attacks double bonds located on the main chains of diene rubber molecules in the presence of peroxides. Then the molecule chains are cut off, and the surface of rubber is degraded and becomes sticky. As the result, the conventional process produces can only produce an industrially or commercially worthless diene rubber article in practice. In addition, the conventional diene rubber compositions generally have a lower flowability, and are melt-fractured if they are subjected to an extrusion. This is why it has been supposed not to vulcanize a conventional diene rubber in an open-type process, although some resin (not rubber) can be extruded and formed with using a peroxide. In the art of rubber manufacturing, the artisans had understood that the combination of diene rubbers and peroxides were not able to well extrude in practice.

The prior art, such as those disclosed in Patent Documents 1 to 4 above, has merely proposed using EPR instead of diene rubbers since EPR lacks double bonds on the main chain. In particular, Patent Document 3 discloses in paragraph 0002 that the conventional crosslinking process using an organic peroxide spoils a conventional rubber if the rubber contacts with air (e.g., oxygen), and the resulted crosslinked rubber article has a sticky surface. The conventional studies above have not addressed problems caused by an open-type vulcanization process using a peroxide.

In addition, pure EPRs are generally weak to oils, have a relatively slow vulcanization rate, and need a higher temperature such as more than 200° C. and a longer time period such as more than 20 minutes to undergo a vulcanization by a peroxide.

In the point of view of the issues above, it has been desired to develop a novel process for manufacturing a diene rubber article by an open-type vulcanization process and a novel raw diene rubber composition which can be used in the novel process.

Solution to Problem

The present inventors have surprisingly found that a diene rubber substance can be vulcanized with a peroxide and formed into an article in an open-type process at a lower temperature. On the basis of the discovery, the present inventors have conceived and completed the present invention.

In an embodiment, the present invention can provide a process for forming an article from a diene rubber, the process comprising the steps of:
providing a raw diene rubber substance comprising 1,2-polybutadiene rubber component;
adding to the raw diene rubber substance a peroxide as a vulcanizing agent;
softening the raw diene rubber at a first temperature of not more than 200° C.;
vulcanizing the diene rubber at a second temperature of not more than 200° C., with contacting the diene rubber to an ambient atmosphere; and
forming from the vulcanized diene rubber an article.

In another embodiment, the present invention can also provide an diene rubber article made by the process above.

In still other embodiment, the present invention can also provide a diene rubber composition configured to be subjected to an extrusion, the composition comprising:
a raw diene rubber substance comprising 1,2-polybutadiene rubber component; and
a peroxide as a vulcanizing agent.

Advantageous Effects of Invention

The present invention enables to vulcanize a diene rubber substance by an open-type process at a relatively lower temperature, and form a diene rubber article therefrom. The present process can also give the rubber a good flowability to reduce or eliminate a melt-fracture phenomenon.

DESCRIPTION OF EMBODIMENTS

Embodiments of the present invention will be explained in detail, but the present invention is not limited to the embodiments.

Definitions

The term of "diene rubber substance" means a rubber substance comprising at least one diene rubber component having double bonds on the main chain. The diene rubber substance may include, but not limited to, isoprene rubber (IR), butadiene rubber (BR), 1,2-polybutadiene rubber (or 1,2-polybutadiene elastomer), styrene-butadiene rubber (SBR), acrylonitrile butadiene rubber (NBR), hydrogenated nitrile rubber (HNBR), chloroprene rubber (CR), and any grade of natural rubber (NR). In an embodiment, the diene rubber substance may include only one or more diene rubber component(s). In another embodiment, the diene rubber substance may include the combination of one or more diene rubber component(s) and one or more non-diene rubber component(s). The diene rubber may include conjugated and non-conjugated diene rubbers.

The phrase of "raw rubber" means in the present specification that a rubber composition which has not been substantially vulcanized yet.

The term of "half-life temperature of a peroxide" means a temperature at which it takes for one-half of a given quantity of a peroxide in dilute solution to decompose. In the case of organic peroxide, the phenomenon follows the formula below:

$$\ln(C_0/C_t) = K_d t$$

where $C_0$ is the initial concentration of an organic peroxide; $C_t$ is the concentration of the peroxide at time t; and $K_d$ is the thermolysis rate constant. The half-life period $t_{1/2}$ is calculated by:

$$t_{1/2} = (\ln 2)/(K_d)$$

The half-life temperature is generally expressed in the art as 1-minute half-life temperature, 1-hour half-life temperature (T1), or 10-hours half-life temperature (T10).

The term "mold" or "molding" in the present specification means that a rubber substance is transformed into an article, and may include vulcanization and/or forming steps. In an embodiment, molding or forming process may be carried out by a head mold or extrusion die.

The term of "transparent" means that a transmitted light passed through an article is mainly comprised of specular transmission, where the ratio of specular-transmitted visible light is large. The degree of transparency is determined, in the present application, from value of haze or total luminous transmittance. An article which lacks "transparency" defined above can be called as "opaque" or "semi-transparent".

The term of "haze" means the degree of dimness in a transparent material, measured according to JIS K7163 (or ISO 14782). The value of haze is determined as a percent of transmitted light which strays from the incident light in the angle of 0.044 rad or more by forward scattering.

The term of "TT" which stands for "total luminous transmittance" means the ratio of light beam passed through a transparent material, measured according to JIS K7361-1 (or ISO 13468-1). The value of total luminous transmittance is determined as the ratio of total transmitting light flux with respect to parallel incident light flux on a test article.

The term of "Type A Durometer Hardness" or "Hs" means the hardness of a rubber substance measured according to JIS K6253. The value of Hs is determined, in the present specification, from the following procedure: constantly pushing a plunger onto a test article, and measuring the depth of the pushed plunger in the article at 0 sec or 30 sec after the pushing.

The term of "tear strength" means the tear strength of a rubber substance measured according to JIS K6252. The value of tear strength is determined, in the present specification, by using a 2 mm-thick sheet of a test material, and converted in N/mm unit.

The term of "tensile at break", "tensile" or "Tb" means the maximum stress at a fracture of a test strip which is stretched at a constant rate, measured according to JIS K6252. In the present specification, the value of tensile is calculated by dividing the maximum stress subjected on a test strip by the original cross-sectional area of the strip, and converting the resulted value into MPa unit.

The term of "elongation at break", "elongation", or "Eb" means a deformation along the stretching (length) axis on a strip which is stretched, measured according to JIS K6251 (ISO37). In the present specification, the value of elongation is represented by the ratio of the elongated length of the strip to the original length of the strip and is expressed in the form of percentage.

The term of "tensile stress" or "modulus" means the stress when a test strip is elongated for a given length, measured according to JIS K6251 (ISO37). In the present specification, the value of modulus is calculated by dividing the load on a test strip which is elongated for a given length by the cross-sectional area of the strip, and converting the resulted value into MPa unit. Modulus at 100%, 300%, or 500% of elongation may be referred to as "M100", "M300", or "M500", respectively.

The term of "Mooney viscosity" means the viscosity of a unvulcanized rubber measured according to JIS K6300-1 or ASTM D 1646. The value of Mooney viscosity is measured, in the present specification, by a Mooney viscometer fitting the standard in JIS K6300-1.

The term of "refractive index" means an index representing the speed of light in a substance, e.g. measured according to JIS K7142.

The term of "vinyl content" refers to the amount of a conjugated diene which is polymerized via 1,2-addition (in the case of butadiene—it would be 3,4-addition in the case of isoprene). Although a pure "vinyl" group is formed only in the case of 1,2-addition polymerization of 1,3-butadiene, the effects of 3,4-addition polymerization of isoprene (and similar addition for other conjugated dienes) on the final properties of the block copolymer will be similar. The result of the addition above, a pendant vinyl group on the polymer skeleton will be produced. The vinyl content in a polymer may be measured using a conventional technique in the art such as proton NMR.

The vinyl content is effectively controlled by varying the relative amount of the distribution agent. As will be appreciated, the distribution agent serves two purposes—it creates the controlled distribution of the mono alkenyl arene and conjugated diene, and also controls the microstructure of the conjugated diene. Suitable ratios of distribution agent to lithium are disclosed and taught in U.S. Pat. No. Re 27,145, which disclosure is incorporated by reference.

As used herein, unless otherwise noted, the term "molecular weight(s)" refers to the true molecular weight in g/mol of the polymer or block of the copolymer. The molecular weights referred to in this specification and claims can be measured with gel permeation chromatography (GPC) using polystyrene calibration standards, such as is done according to ASTM 3536. GPC is a well-known method wherein polymers are separated according to molecular size, the largest molecule eluting first. The chromatograph is calibrated using commercially available polystyrene molecular weight standards. The molecular weight of polymers measured using GPC so calibrated are styrene equivalent molecular weights, also known as apparent molecular weights. The styrene equivalent molecular weight may be converted to true molecular weight when the styrene content of the polymer and the vinyl content of the diene segments are known. The detector used is preferably a combination ultraviolet and refractive index detector. The molecular weights expressed herein are measured at the peak of the GPC trace, converted to true molecular weights, and are commonly referred to as "peak molecular weights". When expressed as apparent molecular weights they are similarly determined with the exception that consideration of the block copolymer composition and the subsequent conversion to true molecular weights is not done.

The words of "comprising", "including", and "containing" mean in the present specification, unless otherwise noted, that an article or component connotes or has an element(s). The spirit of the words may embrace both an internal and external additions.

In the case that the word of "about", "around", or "appropriately" is prefixed to a value, in the present specification, the value can include a tolerance of at least plus/minus 10 percent.

In the present specification, the reference numbers of standards such as ASTM, ISO, and JIS are those known by the artisan in the art at the filing or priority date of the present application.

Outline of Peroxides

The present embodiment may use any peroxides to vulcanize a raw diene rubber substance as long as the vulcanization process finishes successfully under an open-type environment in which the rubber contacts with an ambient atmosphere. The peroxides may include organic and inorganic peroxides. Organic peroxides are generally preferred for the present process due to the adequate half-life temperature and the relatively smaller trace amounts of impurities.

The organic peroxides may include, but not limited to, hydroperoxide ($R^1$—O—O—H), dialkyl peroxide ($R^1$—O—O—$R^2$), peroxy ester ($R^1$—C(O)—O—O—$R^2$), diacyl peroxide ($R^1$—C(O)—O—O—C(O)—$R^2$), peroxy dicarbonate ($R^1$—O—C(O)—O—O—C(O)—O—$R^2$), peroxyketal ($R^1$—O—O—C(—$R^3$)(—$R^4$)—O—O—$R^2$), and ketone peroxide (H—O—O—C(—$R^1$)(—$R^2$)—O—O—H). $R^2$, $R^3$, and $R^4$ may represent, independently or separately, an aliphatic, cycloaliphatic or aromatic group with 1 to 24 carbon atoms, preferably 1 to 12 carbon atoms, more preferably 1 to 10 carbon atoms. $R^1$, $R^2$, $R^3$, and $R^4$ may be branched or non-branched, and may be further substituted by a halo, $C_1$ to $C_8$ aliphatic, cycloaliphatic or aromatic group.

The organic peroxide may include, but not limited to, diisobutyryl peroxide, cumyl peroxyneodecanoate, di-n-propyl peroxydicarbonate, di-sec-butyl peroxydicarbonate, 1,1,3,3-tetramethylbutyl peroxyneodecanoate, di(4-t-butylcyclohexyl) peroxydicarbonate, di(2-ethylhexyl) peroxydicarbonate, t-hexyl peroxyneodecanoate, t-butyl peroxyneodecanoate, t-butyl peroxyneoheptanoate, t-hexyl peroxypivalate, t-butyl peroxypivalate, di(3,5,5-trimethylhexanoyl) peroxide, dilauroyl peroxide, 1,1,3,3-tetramethylbutyl peroxy-2-ethylhexanotae, disuccinic acid peroxide, 2,5-dimethyl-2,5-di(2-ethylhexanoylperoxy)hexane, t-hexyl peroxy-2-ethylhexanoate, di(4-methylbenzoyl) peroxide, t-butyl peroxy-2-ethylhexanoate, di(3-methylbenzoyl) peroxide, dibenzoyl peroxide, 1,1-di(t-butylperoxy)-2-methylcyclohexane, 1,1-di(t-hexylperoxy)-3,3,5-trimethylcyclohexane, 1,1-di(t-hexylperoxy)cyclohexane, 1,1-di(t-butylperoxy)cyclohexane, 2,2-di(4,4-di-(t-butylperoxy) cyclohexyl)propane, t-hexyl peroxy isopropyl monocarbonate, t-butyl peroxymaleic acid, t-butyl peroxy-3,5,5-trimethylhexanoate, t-butyl peroxylaurate, t-butyl peroxy isopropyl monocarbonate, t-butyl peroxy 2-ethylhexyl monocarbonate, t-hexyl peroxybenzoate, 2,5-di-methyl-2,5-di(benzoylperoxy)hexane, t-butyl peroxyacetate, 2,2-di-(t-butylperoxy)butane, t-butyl peroxybenzoate, n-butyl 4,4-di-(t-butylperoxy)valerate, di(2-t-butylperoxyisopropyl) benzene, dicumyl peroxide, di-t-hexyl peroxide, 2,5-dimethyl-2,5-di(t-butylperoxy)hexane, t-butylcumyl peroxide, di-t-butyl peroxide, p-menthane hydroperoxide, 2,5-dimethyl-2,5-di(t-butylperoxy)hexyane-3, diisopropylbenzene hydroperoxide, 1,1,3,3-tetramethylbutyl hydroperoxide, cumene hydroperoxide, t-butyl hydroperoxide, 2,3-dimethyl-2,3-diphenylbutane, bis-3.5.5-trimethylhexanoyl peroxide, 1,3-bis(t-butyl peroxy isopropyl) benzene, and 1,6-bis(t-butyl-peroxycarbonyloxy) hexane.

In an embodiment, the present process may preferably use peroxy ester, peroxy dicarbonate, and peroxyketal, in the point of view of their boiling points and half-life temperatures.

In an embodiment, the peroxide may preferably have the 10-hours half-life temperature of about 20° C. to about 190° C., preferably in the range of about 60° C. to about 150° C., more preferably in the range of about 80° C. to about 120° C. If the 10-hours half-life temperature is too low, for instance less than 20° C., a diene rubber substance may be vulcanized too early (i.e., scorching). If the 10-hours half-life temperature is too high, for instance greater than about 190° C., the vulcanization may be too slow in practice.

In an embodiment, the peroxide may preferably have the 1-minute half-life temperature of equal to or more than about 100° C., preferably equal to or more than about 120° C., more preferably equal to or more than about 140° C. If the 1-minute half-life temperature is too low, for instance less than about 100° C., a diene rubber substance may be vulcanized too early and the rubber is difficult to be extruded.

The present material may comprise equal to or less than about 20 mass parts of peroxide, preferably equal to or less than about 15 mass parts of peroxide, more preferably about 0.1 to 10 mass parts of peroxide, still more preferably about 4 to 8 mass parts of peroxide, with respect to 100 mass parts of the total mass of materials.

The peroxides may be combined with sulfur-containing compounds, as long as the amount of sulfur is not harmful for the aim of present invention, in order to regulate the vulcanization temperature and rate. For instance, the present process may use equal to or less than about 1.0 mass part of sulfur, preferably equal to or less than about 0.5 mass part of sulfur, more preferably about 0.05 to 0.5 mass part of sulfur, with respect to 100 mass parts of the total mass of materials. The amount of peroxides may preferably be relatively low to reduce contamination in a resulted article and to suppress malodor during the manufacturing process. Some conventional techniques regarding the combination of peroxide and sulfur are disclosed in Manik, S P and Banerjee, S, Rubber Chemistry and Technology, July 1969, Vol. 42, No. 3, pp. 744-758, which disclosure is incorporated by reference.

The peroxides may be further combined with other radical crosslinking agents such as ethylene glycol dimethacrylate (EGDMA), trimethylolpropane methacrylate, triallyl isocyanurate, triallyl cyanurate, diethylene glycol diacrylate, and neophenylene glycol diacrylate.

In an embodiment, the peroxide may be inorganic peroxide selected from peroxides of alkali metal, from peroxides of metal in group II of the periodic table, or from peroxides of heavy metal including copper peroxide, titanium peroxide, cerium peroxide and chromium peroxide. The inorganic peroxide may preferably be selected from the group consisting of calcium peroxide, strontium peroxide, barium peroxide, zinc peroxide and cadmium peroxide. In this group, the use of calcium or strontium peroxide is particularly preferred. It is preferred that such an inorganic peroxide may be present in the form of an oxide or glass.

Outline of Diene Rubbers

In an embodiment, the diene rubber substance may comprise one or more diene rubber component(s). The rubber component may be prepared, but not limited to, from $C_4$ to $C_{20}$ olefin (including diolefin and alpha-olefin), preferably $C_4$ to $C_{12}$ olefin, more preferably $C_4$ to $C_8$ olefin.

The olefin may include, but not limited to, 1,2-butadiene, 1,3-butadiene, 2-methyl-1,3-butadiene (i.e., isoprene), 2,3-dimethyl-1,3-butadiene, 1,3-pentadiene, 4-methyl-1-pentene, 1,3-hexadiene, 1,4-hexadiene, 1,3-heptadiene, 4,6-dimethyl-1-heptene, 1,3-octadiene, 1,7-octadiene, 1,3-nonadiene, 1,3-decadiene, 1,9-decadiene, 1,3-dodecadiene, cyclopentene, cyclohexene, cyclooctene, dicyclopentadiene, norbornene, 5-ethylidene-2-norbornene, 5-vinylidene-2-norbornene, and 5-methylene-2-norbornene. The olefin polymer can have any number average molecular weight, but may have 100 g/mol to 100,000 g/mol of number average molecular weight, for instance. The olefin may also include vinyl aromatic hydrocarbons such as styrene, o-methyl styrene, p-methyl styrene, p-tert-butyl styrene, 2,4-dimethyl styrene, alpha-methyl styrene, vinyl naphthalene, vinyl toluene, vinyl xylene, and mixtures thereof.

The term of "non-diene rubber" means a rubber substance in which its unit substantially lacks two double bonds. The non-diene polymer may include, but not limited to, butyl rubber (JIR), fluorine rubber (FKM), ethylene-propylene rubber (EPM), ethylene-propylene-diene rubber (EPDM), urethane rubber (U), and silicone rubber (Q), and may further include any polymers prepared from any hydrocarbons known in the art.

The diene or non-diene rubbers may have some geometrical isomers. The cis content (ratio) of the isomers may affect the properties. The cis content may be measured by the IR spectroscopy according to JIS 6230 or ISO 4650.

The degree of cis content depends on a kind of rubber. For instance, in the case of polyisoprene rubber (IR), "low-cis" diene rubber may have from about 90% to about 95% of cis content, more typically from about 90% to about 94% of cis content, and more further typically from about 90% to about 92% of cis content; and "high-cis" diene polymer may have more than about 95% of cis content, typically from about 95% to about 99% of cis content, and more typically from about 96% to about 99% of cis content.

In the case of polybutadiene rubber (BR), "low-cis" rubber may have from about 20% to about 40% of cis content; "high-cis" rubber may have from about 94% to about 98% of cis content; and "modest-cis" rubber may have an intermediate cis content.

The high-cis diene rubber polymer may include, but not limited to, LHIR-80 (neodymium-catalyzed high-cis polyisoprene rubber manufactured by Moaming Luhua; Mw: about 1800 to 2100 kg/mol; cis content: about 96 to 97%), LHIR-90 (neodymium-catalyzed high-cis polyisoprene rubber manufactured by Moaming Luhua; refractive index at 23° C.: 1.519), Nipol IR2200 (non-neodymium-catalyzed, Ziegler-Natta catalyzed high-cis polyisoprene rubber manufactured by ZEON; Mw: about 1700 kg/mol; cis content: about 98.5%; Mooney viscosity: 82; refractive index at 23° C.: 1.519), and Nipol IR2200L (non-neodymium-catalyzed, Ziegler-Natta catalyzed high-cis polyisoprene rubber manufactured by ZEON; Mooney viscosity: 72).

The low-cis or modest-cis diene rubber polymer may include, for instance, Cariflex IR0307 and Cariflex IR0310 (lithium-catalyzed polyisoprene manufactured by Kraton Polymers; cis content: about 87% to about 91%; refractive index at 23° C.: 1.519), Solprene 255 and Asaprene 755A (styrenic elastomer manufactured by Asahi Kasei), Diene 35NR, Diene 35RNF, Diene 55RNF, Diene 35NF, Diene 55NF, and Diene 51 (modest-cis polybutadiene manufactured by Firestone Polymers; cis content: about 40%; Mooney viscosity: about 35 to about 55), and Nipol BR1241S and Nipol BR1242S (low-cis 1,4-polybutadiene manufactured by ZEON; Mooney viscosity: about 35 to about 55).

The 1,2-polybutadiene may include, but not limited to, JSR RB805, JSR RB810, JSR RB820, JSR RB830, and JSR RB840 (low crystalline syndiotactic 1,2-polybutadiene-based thermoplastic elastomer manufactured by JSR; 1,2-bond content: about 90% to about 96%). The refractive index at 23° C. is as following: JSR RB810: about 1.513, JSR RB820: about 1.515, JSR RB830: about 1.517.

The rubber polymer may preferably have low crystallizability to obtain an adequate flexibility. In the case of polybutadiene block copolymer, the ratio of 1,2-addition may preferably be about 30 percent or more to avoid crystallization after hydrogenation, in particular to avoid too much hardness at a lower temperature.

The rubber substances above may be prepared by using any conventional inert hydrocarbon solvents that have been known to be useful in the art. The appropriate solvent may include, for instance, linear or branched hydrocarbons such as pentane, hexane, heptane, octane, and alkyl-substituted derivatives thereof; aliphatic cyclic hydrocarbons such as cyclopentane, cyclohexene, cycloheptane, and alkyl-substituted derivatives thereof; aromatic hydrocarbons such as benzene, naphthalene, toluene, xylene, and alkyl-substituted derivatives thereof; and hydrogenated aromatic hydrocarbons such as tetralin and decalin.

Unless otherwise noted, the term of "polymer" may also include a modified polymer whose terminus(es) is/are modified by a modifier. The modifier may include, for instance, a compound having one or more functional group(s) selected from amino, amide, alkoxysilyl, isocyanate, imino, imidazole, urea, ether, carbonyl, carboxyl, hydroxyl, nitrile, and pyridyl groups. The modifier may include, but not limited to, 3-(N,N-dimethylamino)propyltrimethoxysilane, 3-(N,N-diethylamino)trimethoxysilane, 3-(N,N-dimethylamino)propyltriethoxysilane, 3-(N,N-diethylaminopropyl)triethoxysilane, 3-glycidoxypropyltrimethoxysilane, 2-(4-pyridylethyl)triethoxysilane, N-(3-triethoxysilylpropyl)-4,5-dihydroimidazole, and silicon tetrachloride.

In an embodiment, the diene rubber substance may include a lithium-catalyzed isoprene. The lithium catalyst may be organic lithium catalysts. The organic lithium catalysts may be a mono-, bis-, tris-, or tetrakis-substituted lithium compound with $C_1$ to $C_{20}$ hydrocarbyl group(s) or preferably with $C_2$ to $C_8$ hydrocarbyl group(s).

The organic lithium catalyst may include, but not limited to, alkyl lithium such as methyl lithium, ethyl lithium, propyl lithium, n-butyl lithium, s-butyl lithium, and t-butyl lithium; aryl lithium such as phenyl lithium and tolyl lithium; alkenyl lithium such as vinyl lithium and propenyl lithium; and alkylene lithium such as tetramethylene lithium and pentamethylene lithium.

In another embodiment, the diene rubber substance may include a neodymium-catalyzed isoprene rubber component, namely an isoprene rubber prepared by using a neodymium-containing catalyst. The neodymium-containing catalyst may include, but not limited to, metal neodymium, and carboxylates, phosphates, phosphites, alkoxides, and diketone complexes of neodymium. The neodymium-containing catalyst may be used, e.g. in the form of a solution of a hydrocarbon solvent.

The carboxylate of neodymium may include, but not limited to, a compound containing a structure having the residue of carboxylate bound to trivalent neodymium. The carboxylates may preferably be saturated or unsaturated carboxylate having $C_1$ to $C_{20}$ straight- or branched-chain and alkyl or alkenyl group(s). The carboxylates may include, but not limited to, 2-ethyl hexanoic acid, neodecanoic acid, naphthenic acid, oleic acid, stearic acid, and benzoic acid.

The phosphates and phosphites of neodymium may include, but not limited to, neodymium [phosphate bis(2-ethylhexyl)], neodymium [phosphate bis(1-methylheptyl)], neodymium [2-ethylhexylphosphonate mono-2-ethylhexyl], neodymium [bis(2-ethylhexyl)phosphinate], neodymium [bis(1-methyl-heptyl)phosphinate], and neodymium [(2-ethylhexyl)(p-nonylphenyl) phosphinate].

The alkoxides of neodymium may have a structure having alkoxy group bound to trivalent neodymium. The alkoxy group may preferably be $C_1$ to $C_{20}$, and may for instance have a saturated or unsaturated, straight-, branched-, or cyclic-skeleton. The alkoxy group may include, but not limited to, 2-ethyl-hexylalkoxy, oleylalkoxy, benzylalkoxy, stearylalkoxy, and phenoxy groups.

The beta-diketone complex of neodymium of course contains a beta-diketone complex part, such as acetylacetone complex, ethylacetylacetone complex, benzoylacetone complex, propionitrileacetone complex, and valerylacetone complex.

In an embodiment, the diene rubber substance may include a rubber polymer component such as butadiene rubber (BR), 1,2-polybutadiene rubber, and styrene-butadiene rubber (SBR). These rubbers have similar properties, and may be adequately softened if they are mixed with a polyisoprene rubber to exert suitable properties. In an embodiment, the rubber polymer may preferably include syndiotactic 1,2-polybutadiene or low-cis BR. In particular, those having a syndiotactic structure are preferred since the structure may contribute toward heat resistance.

In an embodiment, the present raw rubber material may include both a 1,2-polybutadiene rubber component and a second rubber component. The second rubber component may be diene rubber, non-diene rubber, or the both. In an aspect of the embodiment, the second rubber may include, but not limited to, one or more selected from the group consisting of butadiene rubber (BR), styrene butadiene rubber (SBR), acrylonitrile butadiene rubber (NBR), urethane rubber (U), ethylene propylene rubber (EPR), and natural rubber (NR). In an aspect of the embodiment, the amount of the 1,2-polybutadiene rubber component is not less than about 5 mass part, preferably from about 5 to 95 mass parts, more preferably about 10 to 95 mass parts, still more preferably about 20 to 95 mass parts, with the proviso that the total amount of the rubber components is 100 mass parts.

Additional Components

The materials according to the present embodiments may further include additional components or additives as long as the aim of present invention can be achieved. The additional component may include, but not limited to, colorants, modifiers, finishing agents (e.g., lauric acid), antioxidants (e.g., monophenol, bisphenol, polyphenol, sulfur, phosphorus-based compounds such as Irganox 800, Irganox 1010, Irganox 1726, Irgafos 168, and Irganox PS800 manufactured by BASF), reducing agents, oxygen scavengers, light stabilizers, antacids, pH stabilizers, surface treatment agents, heat stabilizers, colorants, fillers (e.g., talc, clay, calcium carbonate, silica, fumed silica, and carbon black), surfactants, gelling agents, biocides, UV absorbents (e.g., salicylic acid, benzophenone, benzotriazole, cyanoacrylate, and hindered amine), dusting agents (e.g., polyolefin such as polyethylene, silica, talc, calcium carbonate powder), flame retardants, and polyphosphoric acid.

The colorant may be used such that the article may have some colors such as clear blue, clear red and clear green. The colorant may include any conventional colorants used in the art, such as color pigments, extender pigments, anti-corrosive pigments, and functional pigments (e.g., phthalocyanine green, titanium, iron blue, iron oxide, lead suboxide, and zinc sulfide).

In an embodiment, the present process may include adding one or more filler(s), such as silica, fumed silica, clay, and carbon black, to improve the surface stability or surface smoothness of the resulted article.

The composition of the present embodiments may include, for instance, about 0.10 to about 10.0 mass parts of the additional components, preferably about 0.20 to about 5.00 mass parts of the additional components, and more preferably about 0.25 to about 2.00 mass parts of the additional components with respect to 100 mass parts of the total amount of materials. In still another embodiments, the additional components may be added in another amount.

In an embodiment, the present materials may be substantially free of oil as a softener to avoid oil bleeding. In another embodiment, the present process does not substantially use any process oil to reduce contaminations and improve the quality of the final article.

Softening Process

The raw materials shown above may either be simultaneously, successively, or continuously put into an apparatus to soften them. The materials may also be prepared as a masterbatch (MB). In an embodiment, the diene rubber substance to be dumped may be in the form of powder, pellets, compounds, blocks, or semi-solid.

In an embodiment, the diene rubber substance and other materials may be fed to and softened in/on a device such as an extruder, heat roller and barrel.

In an embodiment, the present process may use an extruder such as mono-, twin-, and multi-screw extruders, planetary wheel extruders, ram extruders, co-kneaders, disk-pack extruders, and drum extruders. In an aspect of the embodiment, an extruder has a hopper, one or more feed zone(s), and a head mold. In an aspect, a raw rubber substance, peroxide and other additives may be put into an extruder via a hopper simultaneously, successively, or continuously. In another aspect, the raw materials may be separately dumped from separate inlets connected to each feed zone of an extruder. In an embodiment, an extruder may have one or more internal or external heater(s) to heat the target materials.

In another embodiment, the raw materials may be subjected to a calendering apparatus. Calendering apparatuses may be preferred if the goal article is in the form of film or sheet.

In still another embodiment, the raw materials may be kneaded and then exposed to an ambient atmosphere and heat to be aged. One of the process may be referred to as an open-air steaming aging ("Maki-Mushi" in Japanese), in which raw rubber materials are kneaded and pasted around a core rod, and a moist cloth is put around the material, and the wrapped material is steamed to vulcanize.

In an embodiment, the present softening process may be carried out at a temperature of not more than 200° C. In an aspect of the embodiment, the softening temperature may be equal to or less than about 180° C., preferably in the range of about 20° C. to about 170° C., more preferably in the range of about 20° C. to about 150° C.

Vulcanization Process

The present process may carry out a vulcanization step in various ways. For instance, in the case of extrusion, the extruded rubber may be vulcanized just after the extrusion, or put into an oven, a heating, hot-air, or steaming chamber, or an auto-clave to promote the vulcanization by heat, hot air or steam. In an embodiment, the time window of the vulcanization process may be equal to or less than about 20 minutes, preferably equal to or less than about 1 to 20 minutes, more preferably equal to or less than about 2 to 20 minutes.

In an embodiment, the vulcanization step according to the present invention is carried out at a temperature of not more than 200° C., with contacting the diene rubber to an ambient atmosphere. In an aspect of the embodiment, the vulcanization temperature may be equal to or less than about 180° C., preferably in the range of about 20° C. to about 170° C., more preferably in the range of about 60° C. to about 160° C. For instance, the vulcanization may be carried out by a low-temperature oven or steaming autoclave or chamber at about 110 to 160° C., more preferably about 120 to 140° C.

Crosslink Density of Formed Article

In an embodiment, a diene rubber article prepared by the present process may preferably have a good crosslink density. The preferred density value depends on the hardness of rubber, but for instance, may be in the order of $10^{-5}$ mol/cc at hardness of about 60; or may be in the order of $10^{-6}$ mol/cc at hardness of about 20 to 30.

The crosslink density can be calculated from equilibrium volume swelling data in n-heptane at 30 degrees C. and the simplified Flory-Rehner equation (notation of Kraus). The crosslink density $v_e$ can be calculated by the formula:

$$v_e = -(1/V_S)*\{(\ln(1-V_r)+V_r+\mu V_r^2\}/\{V_r^{1/3}-(2V_r/f)\}$$

where $$\mu = \mu_0 + \beta V_r,$$

$\mu_0$ and $\beta V_r$ are constants characteristics of the polymer in question;

Vr is volume fraction of polymer in swollen vulcanizate, $$Vr=(\text{volume of polymer})/\{(\text{volume of polymer})+(\text{volume of solvent})\};$$

VS is molal volume of n-heptane=148.1;
VO is volume fraction of polymer in unswollen state; and
f=4 if tetrafunctional network.

Transparency of Formed Article

In an embodiment, a diene rubber article prepared by the present process may preferably be transparent. The article may preferably have less than about 20% of haze, preferably about 18% of haze, more preferably about 15% or less of haze, more further preferably about 10% or less of haze in view of enough transparency, if measured as a 2-mm sheet according to JIS K6252. If the haze is about 20% or more, the transparency of the article may be too low to meet the practical and aesthetic needs of the market.

In an embodiment, the present diene rubber article may have about 0.5 MPa or more of modulus, more preferably about 1.0 MPa or more, more preferably about 2.0 MPa or more, in view of enough mechanical properties. If the modulus is too low (e.g., in the case that M100 is less than about 0.5 MPa), the article may lack enough mechanical properties.

In an embodiment, the present diene rubber article may have about 30 or more of Type A Durometer hardness, preferably from about 30 to 70, more preferably from about 40 to 70, and more further preferably from 50 to 70. In the case that the present article is incorporated to a product to be used under a severe environment, such as rubber tire, the Type A Durometer hardness may preferably be around 60 to 70. The present article may preferably have Type A Durometer hardness measured at 30 seconds which is about 80% or more of Type A Durometer hardness measured at 0 second, preferably about 90% or more of Type A Durometer hardness measured at 0 second, more preferably about 95% or more of Type A Durometer hardness measured at 0 second.

In an embodiment, the present diene rubber article may have the tensile at break (Tb) of about 1.5 MPa or more, preferably about 2.0 MPa to 15 MPa, more preferably about 3.0 MPa to 15 MPa, still more preferably about 5.0 MPa to 15 MPa. If Tb is too low (e.g., less than about 1.5 MPa), the article may be too fragile to stand an external force.

In an embodiment, the present diene rubber article may have the elongation at break (Eb) of about 150% or more, preferably about 20% or more, more preferably about 250% or more, still more preferably about 300% or more. If Eb is too low (e.g., less than about 150%), the article may lack enough elasticity.

In an embodiment, the present diene rubber article may have the tear strength of about 10 N/mm or more, preferably from about 10 N/mm to 50 N/mm, more preferably from about 20 N/mm to 50 N/mm, measured using a 2 mm-thick sample sheet according to JIS K6252. If the tear strength is too low (e.g., less than about 10 N/mm), the article may lack enough durability.

In an embodiment, the present diene rubber article may preferably have low metal trace contents such as Fe, Li, Al, Nd, and Ti, particularly in the case that the product directly touches a body (e.g., pipes, conduits, or tubes for medical or food grade).

In an embodiment, the present diene rubber article may be preferably made from two or more rubber components that have similar refractive indices to have good transparency. For instance, the difference (absolute value) between the refractive indices of the two rubber components may be about 0.100 or less, preferably about 0.050 or less, more preferably about 0.020 or less, still more preferably about 0.010 or less, about 0.005 or less, about 0.002 or less, or about 0.001 or less.

In an embodiment, the present article may have about 88% or more, preferably about 89% or more, more preferably about 90% or more, still more preferably about 91% or more of total luminous transmittance measured according to JIS K7361-1. If the total luminous transmittance is less than about 88%, the article may lack enough transparency.

The present article may be used in any industrial diene rubber fields. For instance, the article may include, but not limited to, pipes, tubes, hoses, tires, artificial nipples, films, sheets, damping or building materials, food trays, electric wires, cables, and profile-extruded products such as gutters and frames. The article may be applied to medical, biological, or food grade use.

EXAMPLES

Embodiments of the present invention will now be further illustrated with reference to the following working examples, comparative examples, and reference examples; however, without restricting its scope to these embodiments.

Protocol

Materials used for preparing examples are illustrated in the table below. Hereinafter, the amounts of components are written in the unit of phr.

TABLE 1

| Components | #1 | #2 | #3 | #4 | #5 | #6 | #7 | #8 | #9 | #10 | #11 |
|---|---|---|---|---|---|---|---|---|---|---|---|
| Cariflex IR307 | 50 | 50 | 50 | 50 | 70 | 70 | 70 | 70 | 70 | 70 | 70 |
| Cariflex IR310 | | | | | | | | | | | |
| RB-820 | 50 | 50 | 50 | 50 | 30 | 30 | 30 | 30 | 30 | 30 | 30 |
| RB-810 | | | | | | | | | | | |
| NR#1 | | | | | | | | | | | |
| SBR1052 | | | | | | | | | | | |
| EPT3091 | | | | | | | | | | | |
| Kayalene 6-70 | 6 | | | | 6 | | | 6 | 6 | 6 | 6 |
| Kayacarbon BIC-75 | | 6 | | | | 6 | | | | | |
| Trigonox 117 | | | 6 | | | | 6 | | | | |
| Perhexa 25B | | | | | | | | | | | |
| Perbutyl H-69 | | | | 6 | | | | | | | |
| Lauric acid | 0.25 | 0.25 | 0.25 | 0.25 | 0.25 | 0.25 | 0.25 | 0.25 | 0.25 | 0.25 | 0.25 |
| Irganox 1010 | | | | | | | | | | | |
| Irgqnox PS800 | | | | | | | | | | | |
| EGDMA | | | | | | | | | | | |
| S | | | | | | | | | 0.05 | 0.1 | 0.2 | 0.4 |
| Total | 106.25 | 106.25 | 106.25 | 106.25 | 106.25 | 106.25 | 106.25 | 106.30 | 106.35 | 106.45 | 106.65 |

TABLE 2

| Components | #12 | #13 | #14 | #15 | #16 | #17 | #18 | #19 | #20 | #21 |
|---|---|---|---|---|---|---|---|---|---|---|
| Cariflex IR307 | 70 | 70 | 50 | 50 | 50 | 50 | 50 | 70 | 70 | 70 |
| Cariflex IR310 | | | | | | | | | | |
| RB-820 | 30 | 30 | 50 | 50 | 50 | 50 | 50 | 30 | 30 | 30 |
| RB-810 | | | | | | | | | | |
| NR#1 | | | | | | | | | | |
| SBR1052 | | | | | | | | | | |
| EPT3091 | | | | | | | | | | |
| Kayalene 6-70 | | | 2 | 4 | 6 | 8 | 10 | 4 | 6 | 8 |
| Kayacarbon BIC-75 | | | | | | | | | | |
| Trigonox 117 | | | | | | | | | | |
| Perhexa 25B | 0.8 | 0.75 | | | | | | | | |
| Perbutyl H-69 | | | | | | | | | | |
| Lauric acid | 0.25 | 0.25 | 0.25 | 0.25 | 0.25 | 0.25 | 0.25 | 0.25 | 0.25 | 0.25 |
| Irganox 1010 | | | 0.5 | 0.5 | 0.5 | 0.5 | 0.5 | 0.5 | 0.5 | 0.5 |

TABLE 2-continued

| Components | #12 | #13 | #14 | #15 | #16 | #17 | #18 | #19 | #20 | #21 |
|---|---|---|---|---|---|---|---|---|---|---|
| Irgqnox PS800 | | | 1 | 1 | 1 | 1 | 1 | 1 | 1 | 1 |
| EGDMA | | | | | | | | | | |
| S | 0.05 | 0.1 | 0.1 | 0.1 | 0.1 | 0.1 | 0.1 | 0.1 | 0.1 | 0.1 |
| Total | 101.05 | 101.05 | 103.85 | 105.85 | 107.85 | 109.85 | 111.85 | 105.85 | 107.85 | 109.85 |

TABLE 2

| Components | #22 | #23 | #24 | #25 | #26 | #27 | #28 | #29 | #30 | #31 |
|---|---|---|---|---|---|---|---|---|---|---|
| Cariflex IR307 | 50 | 70 | 70 | 70 | 70 | | 50 | 50 | 95 | 50 |
| Cariflex IR310 | | | | | | | | | | |
| RB-820 | 50 | 30 | 30 | 30 | 30 | | 50 | 50 | 5 | 50 |
| RB-810 | | | | | | 30 | | | | |
| NR#1 | | | | | | | | | | |
| SBR1052 | | | | | | | | | | |
| EPT3091 | | | | | | | | | | |
| Kayalene 6-70 | 6 | 6 | 3 | | | | 6 | | 6 | 6 |
| Kayacarbon BIC-75 | | | 3 | 6 | 6 | | | | | |
| Trigonox 117 | | | | | | | | | | |
| Perhexa 25B | | | | | | | | 1 | | |
| Perbutyl H-69 | | | | | | | | | | |
| Lauric acid | 0.25 | 0.25 | 0.25 | 0.25 | 0.25 | 0.25 | 0.25 | 0.25 | 0.25 | 0.25 |
| Irganox 1010 | 0.5 | 0.5 | 0.5 | 0.5 | 0.5 | 0.5 | 0.5 | 0.5 | 0.5 | 0.5 |
| Irgqnox PS800 | 1 | 1 | 1 | 1 | 1 | 1 | 1 | 1 | 1 | 1 |
| EGDMA | | | | | | | | | | |
| S | | | | | 0.1 | 0.1 | | | | |
| Total | 107.75 | 107.75 | 104.75 | 104.75 | 107.85 | 107.85 | 107.75 | 106.75 | 108.75 | 111.75 |

TABLE 4

| Components | #c1 | #c2 | #c3 | #c4 | #c5 |
|---|---|---|---|---|---|
| Cariflex IR307 | 70 | 70 | | | |
| Cariflex IR310 | | | | | |
| RB-820 | | | | | |
| RB-810 | | | | | |
| NR#1 | | | 70 | | |
| SBR1052 | 30 | | 30 | | |
| EPT3091 | | 30 | | 100 | 100 |
| Kayalene 6-70 | 6 | 6 | 6 | 6 | |
| Kayacarbon BIC-75 | | | | | |
| Trigonox 117 | | | | | |
| Perhexa 25B | | | | | 0.8 |
| Perbutyl H-69 | | | | | |
| Lauric acid | 0.25 | 0.25 | 0.25 | 0.25 | 0.25 |
| Irganox 1010 | | | | | |
| Irgqnox PS800 | | | | | |
| EGDMA | | | | | |
| S | | | | | |
| Total | 106.25 | 106.25 | 106.25 | 106.25 | 101.05 |

Rubber Substances

Cariflex IR307: lithium-catalyzed polyisoprene, manufactured by Kraton Polymers; cis content: about 87% to about 91%; refractive index at 23 degree C.: 1.519; density: 0.91 g/cm$^3$.

Cariflex IR310: lithium-catalyzed polyisoprene, manufactured by Kraton Polymers; cis content: about 87% to about 91%; refractive index at 23 degree C.: 1.519; density: 0.91 g/cm$^3$.

RB-820: syndiotactic 1,2-polybutadiene, manufactured by JSR; crystallinity: 25%; melting point: about 95 degrees C.; density: 0.906 g/cm$^3$.

RB-810: syndiotactic 1,2-polybutadiene, manufactured by JSR; crystallinity: 18%; density: 0.901 g/cm$^3$.

NR#1: natural rubber, Ribbed Smoked Sheet #1 made in Thailand; density: about 0.91 g/cm$^3$.

SBR1502: styrene butadiene rubber, manufactured by Astlett Rubber Inc.; density: 0.94 g/cm$^3$; Mooney viscosity: 52.

EPT3091: EPDM rubber, manufactured by Mitsui Chemicals Inc.; density: 0.87 g/cm$^3$; Mooney viscosity: 57.

Peroxides

Kayalene 6-70: 1,6-bis(t-butyl-peroxycarbonyloxy) hexane, manufactured by Kayaku Akzo Corporation.

Kayacarbon BIC-75: t-Butyl peroxy isopropyl carbonate, manufactured by Kayaku Akzo Corporation.

Trigonox 117: tert-butylperoxy 2-ethylhexyl carbonate, manufactured by AkzoNobel.

Perhexa 25B: 2,5-dimethyl-2,5-di(tert-butylperoxy) hexane, manufactured by NOF Corporation.

Perbutyl H-69: t-butyl perhydroxide, manufactured by NOF Corporation.

Other Additives

Lauric acid
Irganox 1010 (manufactured by BASF)
Irganox PS800 (manufactured by BASF)
EGDMA (ethylene glycol dimethacrylate)
S (sulfur)

Unless otherwise noted, the amount of materials are written in the unit of phr.

The materials shown above were formed into a raw rubber compound by the following process using a 5-inch mixing roller (191-TM Test Roll, manufactured by Yasuda Seiki).

(a.) The roller was heated to a temperature near to the melting point of test rubber substance. The test rubber substance(s) were hung on the roller and then pressed and wrapped onto the roller.

(b.) The pressed rubber substance(s) were uniformly kneaded on the roller.

(c.) The resulted uniform rubber band on the roller was added additives other than vulcanizing agents and was further kneaded. The roller was heated to a higher temperature if some additives have a higher melting point. (For instance, Irganox 1010 has m.p. of 110 to 120 degrees C.)

(d.) Vulcanizing agent(s) were added to the rubber substance to uniformly disperse into the rubber substance.

(e.) The resulted rubber substance was cut into a ribbon-like strip (compound) having the thickness of about 5 mm and the width of about 3 cm to 5 cm, or a sheet having the thickness of about 2 mm.

(f.) The resulted strips or sheets were subjected to MDR (RLR-4, a rheometer manufactured by Toyo Seiki) to obtain rheometer curves to estimate appropriate vulcanizing temperature and time ranges. The strips or sheets were then used in the following tests.

Test 1: Preparing Roll Sheets and Vulcanization of them in Gear Oven or Steaming Autoclave, and Measurements of Mechanical Properties Some of inventive samples (#1, . . . ) and comparative samples (#c1, . . . ) listed in the table above were prepared as raw compound sheets. The raw sheets were in a Gear aging oven (manufactured by Ueshima Seisakusho) or a steaming autoclave for the given time period(s) at the given temperature(s) to be vulcanized.

The vulcanized samples were removed from the oven and left in the ambient environment for one day. Then the samples were subjected to measurements of Tb, M100, M300, M500, and Eb. The results are shown in the table below.

TABLE 7

| Sample No. | #c1 | #c2 | #c3 | #c4 | #c5 |
|---|---|---|---|---|---|
| Heated By | Gear Oven | Gear Oven | Gear Oven | Gear Oven | Gear Oven |
| C. Temp (° C.) | 130 | 130 | 130 | 130 | 180 |
| C. Time (min) | 6 | 6 | 6 | 10 | 10 |
| Tb (MPa) | 0.16 | 0.3 | 0.26 | 1 | 1.1 |
| M100 (MPa) | — | 0.27 | 0.16 | — | — |
| M300 (MPa) | — | — | 0.16 | — | — |
| M500 (MPa) | — | — | 0.16 | — | — |
| Eb (%) | 87 | 137 | 1000< | — | — |

The inventive samples exerted good mechanical properties, while the comparative samples had poor Tb.

Test 2: Tube-Extrusion Tests

Test ribbon strips that were made from the formulations above were subjected to a mono-screw extruder (Laboplastomill 10C100 manufactured by Toyo Seiki; screw size: φ15 mm; screw type: full-fright type, compression ratio=2.5; L/D=20; extrusion speed: 90 to 100 rpm). The temperature setting was: zone-1: 95 to 100° C.; zone-2 and zone-3: 100° C.; zone-4 (head mold): 110 to 120° C.

The strips were put into a hopper of the extruder. The extruded tubes were cut off and cooled down for a little while. Then the tubes were put into a Gear aging oven (manufactured by Ueshima Seisakusho) for the given time period(s) at the given temperature(s) to be vulcanized.

The vulcanized tube samples were removed from the oven and left in the ambient environment for one day. Then the samples were subjected to a measurement of Tb. The results are shown in the table below.

TABLE 5

| | Sample No. | | | | | | | | | | | | |
|---|---|---|---|---|---|---|---|---|---|---|---|---|---|
| | #1 | #2 | #3 | #1 | #2 | #3 | #4 | #5 | #6 | #7 | #5 | #6 | #7 |
| Heated By: | Gear Oven | Gear Oven | Gear Oven | Gear Oven | Gear Oven | Gear Oven | Gear Oven | Gear Oven | Gear Oven | Gear Oven | Gear Oven | Gear Oven | Gear Oven |
| C. Temp (° C.) | 120 | 120 | 120 | 130 | 130 | 130 | 180 | 120 | 120 | 120 | 130 | 130 | 130 |
| C. Time (min) | 6 | 6 | 6 | 6 | 6 | 6 | 6 | 6 | 6 | 6 | 6 | 6 | 6 |
| Tb (MPa) | 1.2 | 1.3 | 2.4 | 6.4 | 3.1 | 8.1 | 3.8 | 0.5 | 0.7 | 0.7 | 4.5 | 2.4 | 6.3 |
| M100 (MPa) | 1.2 | 1.1 | 1.3 | 1.9 | 1.7 | 1.9 | 1.8 | 0.5 | 0.7 | 0.7 | 0.9 | 1 | 1 |
| M300 (MPa) | — | — | — | 2.8 | 2.5 | 3 | 2.6 | — | — | — | 1.4 | 1.3 | 1.6 |
| M500 (MPa) | — | — | — | 3.7 | — | 4.3 | 3.6 | — | — | — | 1.8 | 1.6 | 2.2 |
| Eb (%) | 125 | 86 | 124 | 768 | 455 | 884 | 539 | 84 | 126 | 189 | 1000< | 908 | 1000< |

TABLE 6

| | Sample No. | | | | | | | | | | |
|---|---|---|---|---|---|---|---|---|---|---|---|
| | #14 | #15 | #16 | #17 | #18 | #19 | #20 | #21 | #5 | #6 | #7 |
| Heated By: | Gear Oven | Gear Oven | Gear Oven | Gear Oven | Gear Oven | Gear Oven | Gear Oven | Gear Oven | Gear Oven | Gear Oven | Gear Oven |
| C. Temp (° C.) | 130 | 130 | 130 | 130 | 130 | 130 | 130 | 130 | 120 | 120 | 120 |
| C. Time (min) | 10 | 10 | 10 | 10 | 10 | 10 | 10 | 10 | 10 | 10 | 10 |
| Tb (MPa) | 3.5 | 7 | 7.1 | 8 | 6.1 | 4.4 | 4.1 | 3.5 | 3.1 | 3.9 | 5.4 |
| M100 (MPa) | — | — | — | — | — | — | — | — | 1.2 | 1.1 | 1.2 |
| M300 (MPa) | — | — | — | — | — | — | — | — | 2.6 | 2.2 | 2.6 |
| M500 (MPa) | — | — | — | — | — | — | — | — | — | 3.5 | — |
| Eb (%) | — | — | — | — | — | — | — | — | 343 | 509 | 495 |

TABLE 8

| Sample No. | #24 | #25 | #20 | #26 | #27 |
|---|---|---|---|---|---|
| Heated By | Gear Oven | Gear Oven | Gear Oven | Gear Oven | Gear Oven |
| C. Temp (° C.) | 130 | 130 | 130 | 130 | 130 |
| C. Time (min) | 10 | 10 | 10 | 10 | 10 |
| Tb (MPa) | 7.6< | 10.8 | 8.7 | 7 | 7.6 |

The inventive samples had good Tb, and the extruded tubes would meet industrial requirements in the art.

Test 3: Measurement of Crosslink Density

The inventive samples and comparative samples above were dipped into n-heptane in a vial and swollen. Then the solvent was removed and the resulted weight was measured. The test was generally repeated twice for each sample. The crosslink density was calculated from the Flory-Rehner equation as explained above. The results are shown in the following table.

TABLE 9

| Sample No. | Product Type | Heated By | Vulcanization Temp. (° C.) | Vulcanization Time (min.) | Relative Volume Swell Vr | Crosslink Dens. Ve (10^(−6) mol/cc) |
|---|---|---|---|---|---|---|
| #1 | Sheet | Gear oven | 120 | 6 | 0.190 | 10.377 |
| #1 | Sheet | Gear oven | 130 | 6 | 0.173 | 8.038 |
| #1 | Sheet | Gear oven | 130 | 6 | 0.172 | 8.001 |
| #2 | Sheet | Gear oven | 120 | 6 | 0.164 | 7.058 |
| #2 | Sheet | Gear oven | 120 | 6 | 0.174 | 8.225 |
| #2 | Sheet | Gear oven | 130 | 6 | 0.162 | 6.850 |
| #2 | Sheet | Gear oven | 130 | 6 | 0.161 | 6.705 |
| #3 | Sheet | Gear oven | 120 | 6 | 0.172 | 7.910 |
| #3 | Sheet | Gear oven | 120 | 6 | 0.165 | 7.154 |
| #3 | Sheet | Gear oven | 130 | 6 | 0.178 | 8.659 |
| #3 | Sheet | Gear oven | 130 | 6 | 0.179 | 8.879 |
| #5 | Sheet | Gear oven | 120 | 6 | 0.188 | 10.001 |
| #5 | Sheet | Gear oven | 120 | 6 | 0.139 | 4.548 |
| #5 | Sheet | Gear oven | 130 | 6 | 0.127 | 3.678 |
| #5 | Sheet | Gear oven | 130 | 6 | 0.125 | 3.485 |
| #6 | Sheet | Gear oven | 120 | 6 | 0.131 | 3.939 |
| #6 | Sheet | Gear oven | 120 | 6 | 0.143 | 4.928 |
| #6 | Sheet | Gear oven | 130 | 6 | 0.116 | 2.888 |
| #6 | Sheet | Gear oven | 130 | 6 | 0.116 | 2.930 |
| #7 | Sheet | Gear oven | 120 | 6 | 0.121 | 3.203 |
| #7 | Sheet | Gear oven | 120 | 6 | 0.123 | 3.349 |
| #7 | Sheet | Gear oven | 130 | 6 | 0.139 | 4.555 |
| #7 | Sheet | Gear oven | 130 | 6 | 0.134 | 4.173 |
| #1 | Sheet | Steam | 120 | 10 | 0.248 | 21.543 |
| #1 | Sheet | Steam | 120 | 10 | 0.244 | 20.381 |
| #2 | Sheet | Steam | 120 | 10 | 0.211 | 13.758 |
| #2 | Sheet | Steam | 120 | 10 | 0.219 | 15.121 |
| #3 | Sheet | Steam | 120 | 10 | 0.243 | 20.180 |
| #3 | Sheet | Steam | 120 | 10 | 0.243 | 20.247 |
| #5 | Sheet | Steam | 120 | 10 | 0.228 | 16.883 |
| #5 | Sheet | Steam | 120 | 10 | 0.228 | 17.012 |
| #6 | Sheet | Steam | 120 | 10 | 0.193 | 10.852 |
| #6 | Sheet | Steam | 120 | 10 | 0.195 | 11.069 |
| #7 | Sheet | Steam | 120 | 10 | 0.217 | 14.752 |
| #7 | Sheet | Steam | 120 | 10 | 0.217 | 14.819 |
| #c1 | Sheet | Gear Oven | 130 | 6 | N/A | N/A |
| #c1 | Sheet | Gear Oven | 130 | 6 | N/A | N/A |
| #c2 | Sheet | Gear Oven | 130 | 6 | 0.234 | 18.251 |
| #c2 | Sheet | Gear Oven | 130 | 6 | 0.237 | 18.922 |
| #c3 | Sheet | Gear Oven | 130 | 6 | 0.106 | 2.342 |
| #c3 | Sheet | Gear Oven | 130 | 6 | 0.121 | 3.266 |
| #8 | Sheet | Gear Oven | 130 | 6 | 0.124 | 3.452 |
| #8 | Sheet | Gear Oven | 130 | 6 | 0.128 | 3.693 |
| #9 | Sheet | Gear Oven | 130 | 6 | 0.126 | 3.572 |
| #9 | Sheet | Gear Oven | 130 | 6 | 0.126 | 3.549 |
| #10 | Sheet | Gear Oven | 130 | 6 | 0.125 | 3.507 |
| #10 | Sheet | Gear Oven | 130 | 6 | 0.126 | 3.544 |
| #11 | Sheet | Gear Oven | 130 | 6 | 0.125 | 3.491 |
| #11 | Sheet | Gear Oven | 130 | 6 | 0.130 | 3.901 |
| #8 | Sheet | Gear Oven | 130 | 10 | 0.192 | 10.673 |
| #8 | Sheet | Gear Oven | 130 | 10 | 0.190 | 10.337 |
| #9 | Sheet | Gear Oven | 130 | 10 | 0.181 | 9.034 |
| #9 | Sheet | Gear Oven | 130 | 10 | 0.181 | 9.101 |
| #10 | Sheet | Gear Oven | 130 | 10 | 0.192 | 10.606 |
| #10 | Sheet | Gear Oven | 130 | 10 | 0.189 | 10.174 |
| #11 | Sheet | Gear Oven | 130 | 10 | 0.176 | 8.383 |
| #11 | Sheet | Gear Oven | 130 | 10 | 0.176 | 8.381 |
| #12 | Sheet | Gear Oven | 160 | 6 | 0.151 | 5.667 |
| #12 | Sheet | Gear Oven | 160 | 6 | 0.143 | 4.940 |
| #13 | Sheet | Gear Oven | 160 | 6 | 0.145 | 5.112 |
| #13 | Sheet | Gear Oven | 160 | 6 | 0.138 | 4.512 |
| #14 | Sheet | Gear Oven | 120 | 10 | 0.188 | 10.044 |
| #14 | Sheet | Gear Oven | 120 | 10 | 0.207 | 13.065 |
| #15 | Sheet | Gear Oven | 120 | 10 | 0.174 | 8.212 |
| #15 | Sheet | Gear Oven | 120 | 10 | 0.174 | 8.203 |
| #16 | Sheet | Gear Oven | 120 | 10 | 0.184 | 9.451 |
| #16 | Sheet | Gear Oven | 120 | 10 | 0.180 | 8.961 |
| #17 | Sheet | Gear Oven | 120 | 10 | 0.186 | 9.737 |
| #17 | Sheet | Gear Oven | 120 | 10 | 0.184 | 9.512 |
| #18 | Sheet | Gear Oven | 120 | 10 | 0.178 | 8.752 |
| #18 | Sheet | Gear Oven | 120 | 10 | 0.175 | 8.289 |
| #14 | Sheet | Gear Oven | 120 | 20 | 0.181 | 9.068 |
| #14 | Sheet | Gear Oven | 120 | 20 | 0.179 | 8.865 |
| #15 | Sheet | Gear Oven | 120 | 20 | 0.197 | 11.430 |
| #15 | Sheet | Gear Oven | 120 | 20 | 0.196 | 11.291 |
| #16 | Sheet | Gear Oven | 120 | 20 | 0.211 | 13.765 |
| #16 | Sheet | Gear Oven | 120 | 20 | 0.212 | 13.864 |
| #17 | Sheet | Gear oven | 120 | 20 | 0.217 | 14.758 |
| #17 | Sheet | Gear Oven | 120 | 20 | 0.216 | 14.653 |
| #18 | Sheet | Gear Oven | 120 | 20 | 0.226 | 16.450 |
| #18 | Sheet | Gear Oven | 120 | 20 | 0.225 | 16.335 |
| #14 | Sheet | Gear Oven | 130 | 10 | 0.185 | 9.584 |
| #14 | Sheet | Gear Oven | 130 | 10 | 0.126 | 3.609 |
| #15 | Sheet | Gear Oven | 130 | 10 | 0.196 | 11.306 |
| #15 | Sheet | Gear Oven | 130 | 10 | 0.195 | 11.083 |
| #16 | Sheet | Gear Oven | 130 | 10 | 0.211 | 13.684 |
| #16 | Sheet | Gear Oven | 130 | 10 | 0.214 | 14.212 |
| #17 | Sheet | Gear Oven | 130 | 10 | 0.216 | 14.655 |
| #17 | Sheet | Gear Oven | 130 | 10 | 0.215 | 14.481 |
| #18 | Sheet | Gear Oven | 130 | 10 | 0.222 | 15.745 |
| #18 | Sheet | Gear Oven | 130 | 10 | 0.224 | 16.080 |
| #14 | Sheet | Gear Oven | 130 | 20 | 0.213 | 14.081 |
| #14 | Sheet | Gear Oven | 130 | 20 | 0.215 | 14.409 |
| #15 | Sheet | Gear Oven | 130 | 20 | 0.237 | 18.869 |
| #15 | Sheet | Gear Oven | 130 | 20 | 0.234 | 18.208 |
| #16 | Sheet | Gear Oven | 130 | 20 | 0.250 | 21.883 |
| #16 | Sheet | Gear Oven | 130 | 20 | 0.251 | 22.240 |
| #17 | Sheet | Gear Oven | 130 | 20 | 00.275 | 28.893 |
| #17 | Sheet | Gear Oven | 130 | 20 | 0.274 | 28.632 |
| #18 | Sheet | Gear Oven | 130 | 20 | 0.310 | 40.984 |
| #18 | Sheet | Gear Oven | 130 | 20 | 0.311 | 41.365 |
| #19 | Sheet | Gear Oven | 130 | 10 | 0.161 | 6.664 |
| #19 | Sheet | Gear Oven | 130 | 10 | 0.162 | 6.814 |
| #20 | Sheet | Gear Oven | 130 | 10 | 0.186 | 9.701 |
| #20 | Sheet | Gear Oven | 130 | 10 | 0.187 | 9.980 |
| #21 | Sheet | Gear Oven | 130 | 10 | 0.209 | 13.318 |
| #21 | Sheet | Gear Oven | 130 | 10 | 0.209 | 13.300 |
| #19 | Sheet | Gear Oven | 130 | 20 | 0.211 | 13.659 |
| #19 | Sheet | Gear Oven | 130 | 20 | 0.210 | 13.602 |
| #20 | Sheet | Gear Oven | 130 | 20 | 0.231 | 17.590 |
| #20 | Sheet | Gear Oven | 130 | 20 | 0.233 | 18.026 |
| #21 | Sheet | Gear Oven | 130 | 20 | 0.287 | 32.559 |
| #21 | Sheet | Gear Oven | 130 | 20 | 0.288 | 32.856 |
| #22 | Tube | Gear Oven | 130 | 10 | 0.224 | 16.237 |
| #22 | Tube | Gear Oven | 130 | 10 | 0.217 | 14.892 |
| #16 | Tube | Gear Oven | 130 | 10 | 0.202 | 12.223 |
| #16 | Tube | Gear Oven | 130 | 10 | 0.201 | 12.067 |
| #23 | Tube | Gear Oven | 130 | 10 | 0.185 | 9.650 |
| #23 | Tube | Gear Oven | 130 | 10 | 0.193 | 10.708 |
| #20 | Tube | Gear Oven | 130 | 10 | 0.185 | 9.700 |
| #20 | Tube | Gear Oven | 130 | 10 | 0.193 | 10.736 |
| #22 | Tube | Steam | 120 | 10 | 0.240 | 19.464 |
| #22 | Tube | Steam | 121 | 10 | 0.245 | 20.602 |
| #16 | Tube | Steam | 122 | 10 | 0.222 | 15.827 |
| #16 | Tube | Steam | 123 | 10 | 0.226 | 16.594 |

TABLE 9-continued

| Sample No. | Product Type | Heated By | Vulcanization Temp. (° C.) | Vulcanization Time (min.) | Relative Volume Swell Vr | Crosslink Dens. Ve $(10^{-6}$ mol/cc) |
|---|---|---|---|---|---|---|
| #23 | Tube | Steam | 124 | 10 | 0.221 | 15.568 |
| #23 | Tube | Steam | 125 | 10 | 0.219 | 15.254 |
| #20 | Tube | Steam | 126 | 10 | 0.204 | 12.437 |
| #20 | Tube | Steam | 127 | 10 | 0.230 | 12.417 |
| #24 | Tube | Gear Oven | 130 | 10 | 0.177 | 8.517 |
| #24 | Tube | Gear oven | 130 | 10 | 0.161 | 6.665 |
| #25 | Tube | Gear Oven | 130 | 10 | 0.166 | 7.276 |
| #25 | Tube | Gear Oven | 130 | 10 | 0.166 | 7.288 |
| #20 | Tube | Gear Oven | 130 | 10 | 0.200 | 11.932 |
| #20 | Tube | Gear Oven | 130 | 10 | 0.205 | 12.641 |
| #26 | Tube | Gear Oven | 130 | 10 | 0.203 | 12.357 |
| #26 | Tube | Gear Oven | 130 | 10 | 0.207 | 13.096 |
| #27 | Sheet | Gear Oven | 130 | 10 | 0.099 | 1.948 |
| #27 | Sheet | Gear Oven | 130 | 10 | 0.141 | 4.800 |
| #28 | Sheet | Gear Oven | 120 | 4 | 0.158 | 6.330 |
| #28 | Sheet | Gear Oven | 120 | 6 | 0.395 | 87.550 |
| #28 | Sheet | Gear Oven | 120 | 10 | 0.452 | 136.397 |
| #29 | Sheet | Gear Oven | 160 | 4 | 0.251 | 22.073 |
| #29 | Sheet | Gear Oven | 160 | 10 | 0.287 | 32.707 |
| #30 | Sheet | Gear Oven | 120 | 6 | 0.269 | 26.917 |
| #30 | Sheet | Gear Oven | 120 | 10 | 0.306 | 39.254 |

The inventive samples generally had good crosslink densities. Comparative sample #c1 was not vulcanized at all and dissolved in the solvent. Comparative samples #c2 and #c3 were not fully dissolved in the solvent, but they lack enough Tb. In addition, the solvent which contained comparative samples #c2 got cloudy.

Test 4: Surface Observations

Figure 1:
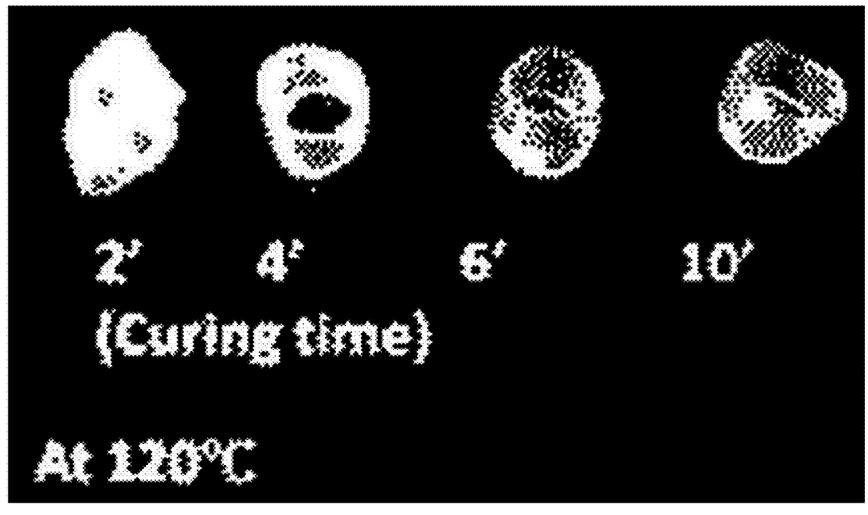
FIG. 1 illustrates a picture of extruded tubes made from sample #31.

Inventive sample #31 was prepared and extruded as a tube as the same as Test 2 above, except that the temperature setting of the extruder was: zone-1, zone-2 and zone-3: 120° C.; zone-4 (head mold): 120° C. The curing temperature in the Gear oven was 120° C. and the curing time was 2, 4, 6, or 10 minutes. The cured samples had the smooth surfaces, and there were no stickiness thereon. Their pictures are shown in FIG. 1.

Test 5: Measurement of Haze

In order to estimate the haze of the present article, Cariflex IR307, RB-820, lauric acid, Perhexa 25B, and EGDMA were mixed and kneaded to obtain a 2-mm thick sheet. The obtained sheets were subjected to haze and TT measurements. The results are shown below.

Sample #a1
Cariflex IR307: 95 phr
RB-820: 5 phr
lauric acid: 0.25 phr
Perhexa 25B: 2 phr
EGDMA: 4 phr
Cure Temp.: 150 degrees C.
Cure Time: 13 min.
Haze: 5%
TT: 91%

Sample #a2
Cariflex IR307: 80 phr
RB-820: 20 phr
lauric acid: 0.25 phr
Perhexa 25B: 2 phr
EGDMA: 4 phr
Cure Temp.: 150 degrees C.
Cure Time: 7 min.
Haze: 5%
TT: 91%

Sample #a3
Cariflex IR307: 90 phr
RB-820: 10 phr
lauric acid: 0.25 phr
Perhexa 25B: 2 phr
EGDMA: 4 phr
Cure Temp.: 160 degrees C.
Cure Time: 10 min.
Haze: 16%
TT: 92%

The invention claimed is:

1. A process for forming an article from a diene rubber, the process comprising the steps of:
   providing a raw diene rubber substance comprising 1,2-polybutadiene rubber component;
   adding to the raw diene rubber substance a peroxide as a vulcanizing agent;
   softening the raw diene rubber substance containing peroxide as the vulcanizing agent at a first temperature of not more than 200° C. to produce a softened diene rubber;
   vulcanizing the softened diene rubber at a second temperature of not more than 200° C., by contacting the softened diene rubber to an ambient atmosphere to produce a vulcanized diene rubber wherein the vulcanizing step is carried out after the softened diene rubber is extruded from an extruder; and
   forming from the vulcanized diene rubber an article wherein the article has a 100% modulus of about 0.5 MPa or more.

2. The process according to claim 1, wherein the peroxide is an organic peroxide compound.

3. The process according to claim 2, wherein the organic peroxide compound is selected from the group consisting of hydroperoxide, dialkyl peroxide, peroxy ester, diacyl peroxide, peroxy dicarbonate, peroxyketal, and ketone peroxide.

4. The process according to claim 3, wherein the 10-hours half-life temperature of the peroxide is in the range of about 20° C. to about 190° C.

5. The process according to claim 4, wherein the 1-minute half-life temperature of the peroxide is equal to or more than about 100° C.

6. The process according to claim 5, wherein the first temperature is equal to or less than about 180° C.

7. The process according to claim 6, wherein the second temperature is equal to or less than about 180° C.

8. The process according to claim 1, wherein the providing step further includes:
   mixing 1,2-polybutadiene rubber component and a second rubber component, wherein the second rubber component includes one or more selected from the group consisting of isoprene rubber (IR), butadiene rubber (BR), styrene butadiene rubber (SBR), acrylonitrile butadiene rubber (NBR), urethane rubber (U), ethylene propylene rubber (EPR), and natural rubber (NR); and
   providing the mixture as the raw diene rubber substance.

9. The process according to claim 8, wherein the isoprene rubber (IR) component includes one or more selected from the group consisting of low-cis isoprene, high-cis isoprene, neodymium-catalyzed isoprene, lithium-catalyzed isoprene, and Ziegler-Natta-catalyzed isoprene.

10. The process according to claim 9, wherein the amount of the 1,2-polybutadiene rubber component is from about 5 to 95 mass parts with the proviso that the total amount of the rubber components is 100 mass parts.

11. The process according to claim 10, wherein the ambient atmosphere is air containing oxygen.

12. The process according to claim 11, wherein the softening step is carried out in an extruder.

13. The process according to claim 12, wherein the process does not comprise adding a filler and a process oil.

14. The process according to claim 12, further comprising the step of adding a filler.

15. A diene rubber article made by the process according to claim 1.

16. The article according to claim 15, wherein the article has haze of less than about 20 measured according to JIS K7136 as a 2 mm thick sheet.

17. The article according to claim 16, wherein the article is substantially free of silica or process oil.

18. A process for forming an article from a diene rubber, the process comprising the steps of:

providing a diene rubber composition configured to be subjected to an extrusion, the composition comprising:
a raw diene rubber substance comprising 1,2-polybutadiene rubber component; and
a peroxide as a vulcanizing agent;
softening the raw diene rubber at a first temperature of less than 200° C.;
vulcanizing the diene rubber at a second temperature of less than 200° C., with contacting the diene rubber to an ambient atmosphere to produce a vulcanized diene rubber, wherein the vulcanizing step is carried out after the rubber is extruded from an extruder;
wherein an article formed from the vulcanized diene rubber has haze of less than about 20% and is substantially free of silica or process oil and wherein the article has a modulus of about 0.5 MPa or more.

* * * * *